Figure 1:
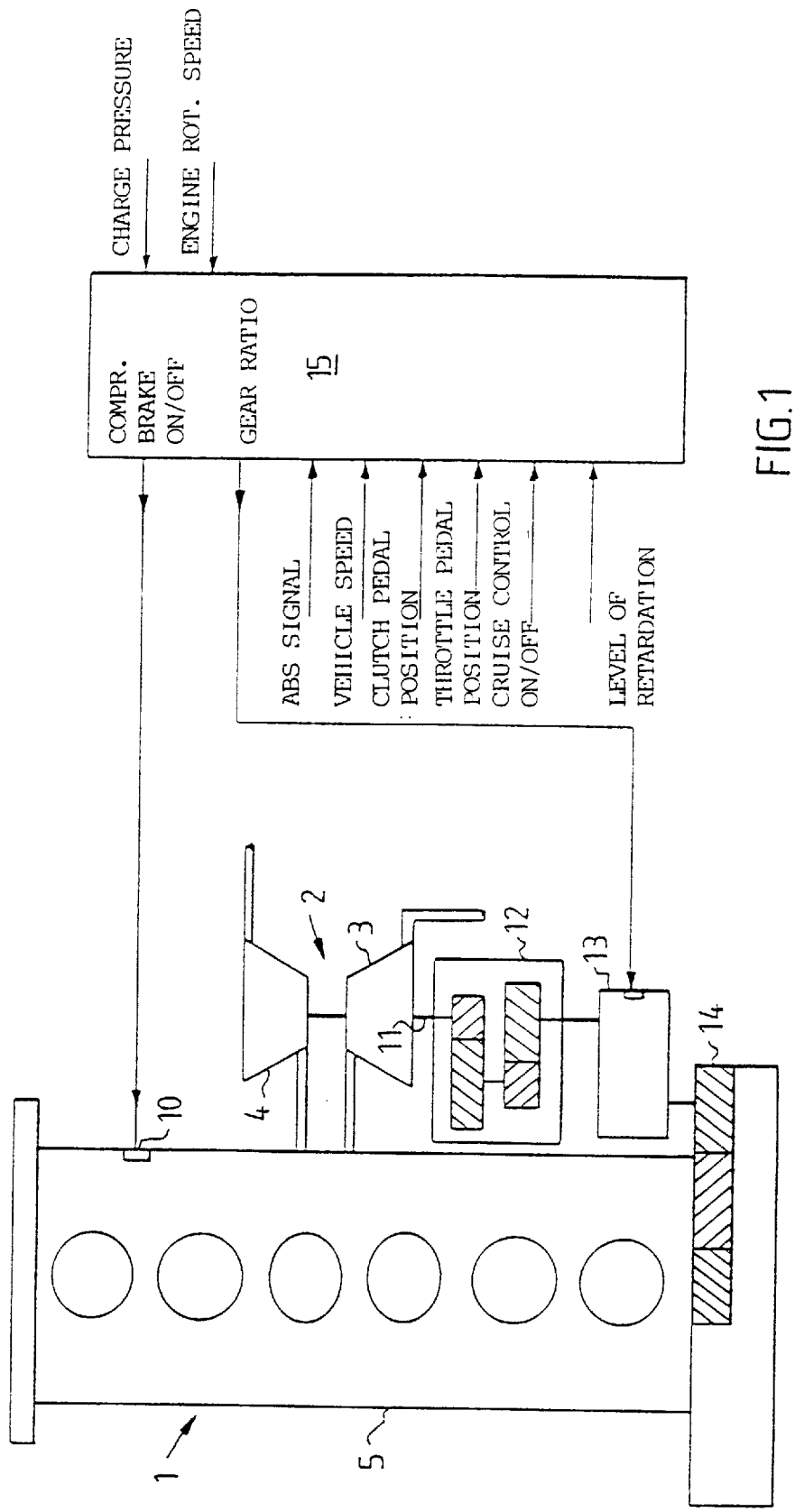

United States Patent

Arnell et al.

[11] Patent Number: 5,887,434
[45] Date of Patent: Mar. 30, 1999

[54] ARRANGEMENT FOR REGULATING THE ENGINE BRAKING EFFECT OF A COMBUSTION ENGINE

[75] Inventors: Jan Arnell, Hisings Kärra; Sören Udd, Nödinge; Magnus Dahlgren, Västra Frölunda, all of Sweden

[73] Assignee: AB Volvo, Gothenburg, Sweden

[21] Appl. No.: 750,454

[22] PCT Filed: Jun. 15, 1995

[86] PCT No.: PCT/SE95/00729

§ 371 Date: Dec. 6, 1996

§ 102(e) Date: Dec. 6, 1996

[87] PCT Pub. No.: WO95/35438

PCT Pub. Date: Dec. 28, 1995

[30] Foreign Application Priority Data

Jun. 17, 1994 [SE] Sweden ................................. 9402135

[51] Int. Cl.$^6$ ................................................. F02B 37/10
[52] U.S. Cl. ............................................. 60/608; 123/561
[58] Field of Search ...................... 60/607, 608; 123/561

[56] References Cited

U.S. PATENT DOCUMENTS 5,133,188 7/1992 Okada .
5,729,978 3/1998 Hiereth et al. ............................. 60/607

FOREIGN PATENT DOCUMENTS 0 517 675 12/1992 European Pat. Off. .
42 10 070 2/1993 Germany .

*Primary Examiner*—Michael Koczo
*Attorney, Agent, or Firm*—Young & Thompson

[57] ABSTRACT

Arrangement for regulating the engine braking effect of a compressor (2) supercharged combustion engine (1) in a vehicle, which engine is equipped with an engine braking effect-increasing device, such as a compression brake device (10). The compressor is driveably connectable to the cam shaft of the engine via a transmission (13) with variable gearing in such a manner that the rotational speed of the compressor increases in relation to the engine rotation speed when the engine rotation speed decreases.

5 Claims, 2 Drawing Sheets ered thereto, engine data such as the degree of charging
ARRANGEMENT FOR REGULATING THE ENGINE BRAKING EFFECT OF A COMBUSTION ENGINE The present invention relates to an arrangement for regulating the engine braking effect of a compressor supercharged combustion engine in a vehicle, which engine is equipped with a device for increasing the engine braking effect in a braking mode, as well as means actuable by the driver of the vehicle for activating the engine braking effect-increasing device.

It is known that the engine braking effect of a vehicle can be increased with the help of a device by means of which the combustion chamber of the engine in a braking mode can be connected to the exhaust system, for example by means of the normal exhaust valves being opened, during the latter portion of the compression stroke. As a result of this, the air compressed during the compression stroke flows out of the cylinders and the compression work performed during the compression stroke cannot be recovered during the expansion stroke, thereby providing an increase in the braking effect of the engine. A further increase of the braking effect can be achieved in a known manner by means of the exhaust system also being connected to the cylinders during the latter portion of the induction stroke so that gas from the exhaust system can flow into the cylinders. This results in a pressure increase in the cylinder and an inner charging which leads to an increase in the compression work after interruption of the connection between the cylinders and the exhaust system. Another known engine braking effect-increasing device is an exhaust pressure regulator (AP-regulator), i.e. a throttle in the exhaust system by means of which the back-pressure in the exhaust system can be increased during engine braking.

When using an AP-regulator to increase the engine braking effect, the quantity of air flowing through the cylinders is, however, reduced, which results in increased engine temperatures and thus a limitation to the possible braking effect.

The object of the present invention is to provide a braking effect-regulating arrangement of the type mentioned in the introductory portion which permits greatly increased braking effect in engine braking effect-increasing devices hitherto known, particularly at low engine speeds.

This is achieved in accordance with the invention by means of the compressor being connected to the cam shaft of the engine via a gear arrangement having variable gearing, and the gearing being controllable by a control unit in such a manner that, in a braking mode, the rotational speed of the compressor can be increased with respect to the rotational speed of the engine when the rotational speed of the engine decreases.

By varying the gearing so that the rotational speed of the compressor increases in the stated manner, the degree of charging increases, which results in an increase in the braking effect of the hitherto known engine braking devices. Since the degree of charging increases, the quantity of throughflow air also increases. Thus, an increased airflow from the compressor through the engine is obtained which thereby provides improved cooling as well as the increased braking effect.

In a preferred embodiment, the transmission is a gear arrangement with infinitely variable gearing, a so-called CVT. The arrangement according to the invention is hereby particularly advantageously employed on an engine having a turbo compressor which, in its roll as a flow machine, has considerably poorer charging capabilities at low speed than a displacement machine.

In a particularly advantageous embodiment of the arrangement according to the invention, the controls operated by the driver are connected to a control unit to which the driver can, via said controls, input a desired value for the retardation of the vehicle and in which, via sensors connected thereto, engine data such as the degree of charging and engine speed, as well as vehicle data such as the vehicle velocity, the position of the throttle pedal and the position of the clutch, are fed, whereby the control unit is arranged to compare the inputted desired value of retardation with the actual value and to adjust the gearing between the engine cam shaft and the rotational speed of the compressor to control the degree of charging based upon the measured difference and the respective positions of the throttle and clutch pedals.

Figure 2:
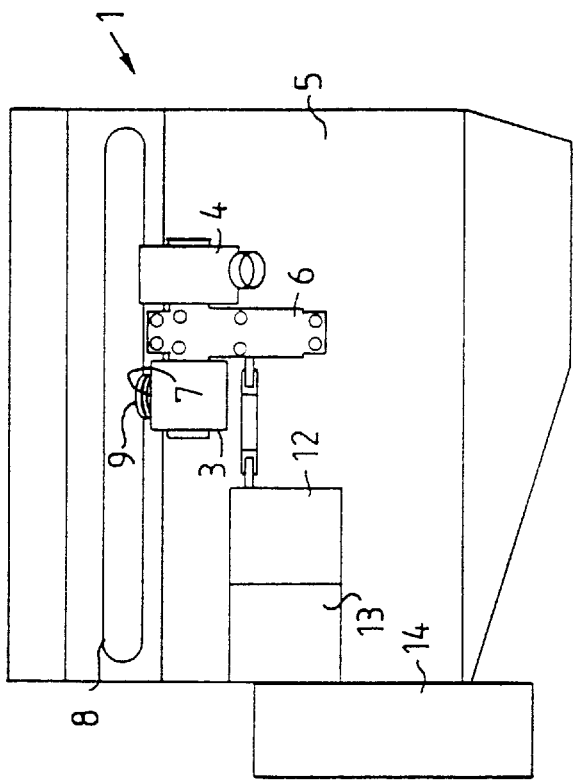
Figure 3:
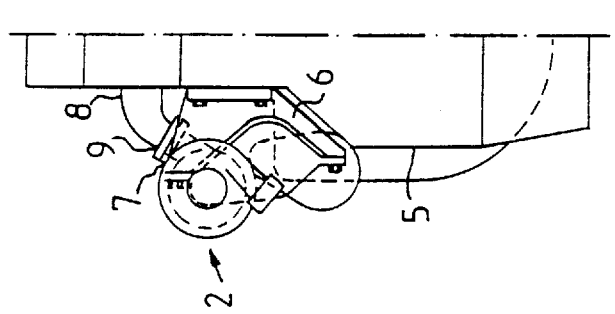

The invention will be described in greater detail with reference to the embodiment shown in the drawings in which FIG. 1 is a schematic view of a six cylinder turbocharged combustion engine with one embodiment of an arrangement according to the invention, and FIGS. 2 and 3 show a schematic side view and half front view respectively of the engine shown in FIG. 1.

In the drawings, reference numeral 1 generally denotes a six cylinder diesel engine, whilst reference numeral 2 generally denotes a turbo compressor which has a turbine portion 3 and a compressor portion 4. The turbo compressor 2 is rigidly mounted in a bracket 6 fixedly bolted to the cylinder block 5 of the engine 1 and has its exhaust inlet in the turbine portion 3 connected to the exhaust manifold 8 of the engine via a flexible connection 9, for example a bellows, which permits certain displacement of the outlet of the exhaust manifold 8 relative to the inlet to the turbine portion, which displacement is caused by differences in thermal expansion. The compressor portion 4 is connected to the air inlet conduit of the engine, for example via an intercooler, in a conventional manner and is not shown in greater detail.

The engine 1 is schematically illustrated with a compression braking device 10 which can be of the type which is shown and described in SE 466 320 and by means of which the cylinders of the engine during the latter portion of the combustion stroke can be connected to the engines exhaust manifold in order to increase the engine braking effect. Reference is accordingly made to SE 466 320 for a more detailed description of the construction and function of a possible embodiment of the compression braking device 10.

The rotor shaft 11 of the turbo compressor 2 is connected via a high speed transmission 12, a transmission 13 with infinitely variable gearing (so-called CVT) and a low-speed transmission 14, to the not shown cam shaft of the engine. Within the chain of components from the rotor shaft 11 to the cam shaft there may be included a not shown freewheel clutch, by means of which the drive connection between the rotor shaft 11 and the cam shaft can be interrupted. In the high-speed transmission 12, a first rotational speed reduction from the working speed of about 100,000 rmp of the turbo aggregate down to the working rotational speed of about 10,000 rpm for the CVT-transmission 13 is obtained. In the low-speed transmission 14, the rotational speed is further reduced to the working rotational speed of about 2,000 rpm for the cam shaft.

By mounting the turbo unit 2 to the engine block in the above described manner, the risk for change in alignment between the shafts of the turbo unit and the transmission 12 is eliminated. which change would otherwise arise due to differences in thermal expansion between the exhaust manifold and the engine block should the turbo unit have been rigidly mounted to the exhaust manifold in a conventional manner.

A control unit 15, preferably in a form of a microprocessor, provides output signals for activating or deactivating the (not shown) clutch which connects the drive of the turbo unit 2 from the engine cam shaft and which can be integrated in the CVT-transmission 13. In addition, the control unit 15 provides signals for adjusting the gearing of the transmission 13 depending on a quantity of engine and vehicle data inputted to the control unit from sensors known per se and not shown in greater detail.

As is indicated in FIG. 1, signals are inputted into the control unit 15 which represent charging pressure (degree of charging) and engine rotational speed, i.e. engine data, as well as signals which represent activation or non-activation of ABS, vehicle velocity, clutch pedal position, throttle pedal position, activation or deactivation of cruise control and level of retardation, i.e. vehicle data. The function of the arrangement according to the invention is the following:

By means of a not shown control which can be integrated with a cruise control known per se, the driver inputs the desired retardation level (desired value) and activates the cruise control so that a signal representing the chosen desired value is inputted in the control unit 14, which control unit compares the inputted desired value with the calculated actual value of the retardation. When the driver releases the throttle pedal and on condition that the clutch pedal is not depressed, depending on the difference between the actual value and the desired value, the control unit 15 will adjust the gearing of the CVT-transmission 13 in order to obtain a suitable rotational speed of the turbo unit 2 to attain a suitable degree of charge at the same time that the compression brake 10 is activated. The greater the difference is between the desired value and the actual value of the retardation, the greater the gearing-up of the rotational speed of the turbo unit. Should the retardation be so great that the drive-wheels skid, the ABS-sensor provides a signal to reduce the engine braking effect by changing the gearing or disconnecting the compression braking. Disconnection of the compression braking also occurs if the driver should depress the clutch pedal, which is important in order to prevent stalling of the engine with resulting loss of servo assistance for the steering and brakes.

With the invention, an arrangement is achieved by means of which it is possible to greatly increase the engine braking effect of known engine braking devices, such as for example compression braking devices or AD-regulators, and also, particularly when using a turbo compressor, automatically control the engine braking effect in a manner which implies that the "normal" large reduction of the charging capabilities of the turbo compressor at decreasing engine speed is counteracted and that the engine braking effect in principal can be maintained constant within a predetermined engine speed range.

The invention has been described in the above with reference to an embodiment having a turbo compressor and a mechanical transmission with continuously variable gearing, for example CVT-transmission, though hydraulic transmission (pump-motor) or electric transmission (generator-motor) can also be used. Transmissions with stepwise variable gearing can of course be employed within the scope of the invention, as can compressors of the deplacement type.

We claim:

1. Arrangement for regulating the engine braking effect of a compressor supercharged combustion engine in a vehicle, which engine is equipped with a device (10) for increasing the engine braking effect during a braking mode and controls actuable by the driver of the vehicle for actuating the engine braking effect-increasing device, wherein the compressor (2) is connected to the cam shaft of the engine via a transmission (13) with variable gearing, and wherein the transmission is controllable by a control unit (15) such that, in the braking mode, the rotational speed of the compressor increases in relation to the rotational speed of the engine when the rotational speed of the engine decreases.

2. Device according to claim 1, wherein the transmission (13) is a transmission with infinitely variable gearing.

3. Device according to claim 1 wherein the compressor (2) is a turbo compressor.

4. Device according to claim 3, wherein the turbo compressor (2) is mounted on a bracket (6) fixed to the engine cylinder block (5), and the exhaust inlet of the turbine communicates with the outlet of the exhaust manifold (8) of the engine via a conduit (9) which permits certain relative displacement between the turbo compressor and the exhaust manifold.

5. Arrangement according to claim 1, wherein the controls actuated by the driver are connected to said control unit (15) to which the driver, via said controls, can input a desired signal for the retardation of the vehicle and/or velocity and in which, via sensors connected thereto, engine data as well as vehicle data are inputted, and wherein the control unit is arranged to compare the inputted desired value of retardation and/or velocity with the actual values and to regulate the gearing between the rotational speed of the engine cam shaft and the compressor for controlling the degree of charging based upon the measured difference and the respective positions of the throttle pedal and the clutch pedal.

* * * * *